(12) United States Patent
Kang

(10) Patent No.: US 6,735,240 B1
(45) Date of Patent: May 11, 2004

(54) SYSTEM AND METHOD OF DESKEW BUFFERING SIGNALS

(75) Inventor: Inyup Kang, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 498 days.

(21) Appl. No.: 09/718,275

(22) Filed: Nov. 21, 2000

(51) Int. Cl.$^7$ .................................................. H04B 1/69

(52) U.S. Cl. ...................... 375/148; 375/130; 375/136; 375/142; 375/147; 370/335; 370/342

(58) Field of Search ................................. 375/130, 133, 375/136, 140, 142, 145, 147, 148; 370/335, 342; 711/201

(56) References Cited

U.S. PATENT DOCUMENTS

| | | | |
|---|---|---|---|
| 5,764,687 A | 6/1998 | Easton | 375/147 |
| 6,122,311 A | 9/2000 | Watanabe et al. | 375/147 |
| 6,128,329 A * | 10/2000 | Takakusaki | 375/140 |
| 6,181,912 B1 * | 1/2001 | Miller et al. | 455/12.1 |
| 6,359,868 B1 * | 3/2002 | Chen et al. | 370/335 |
| 6,453,405 B1 * | 9/2002 | Hoyle et al. | 711/201 |
| 6,590,886 B1 * | 7/2003 | Easton et al. | 370/320 |

FOREIGN PATENT DOCUMENTS

| WO | WO 00/48344 | * 8/2000 |
|---|---|---|

\* cited by examiner

*Primary Examiner*—Shuwang Liu
(74) *Attorney, Agent, or Firm*—Philip R. Wadsworth; Charles D. Brown; Kevin T. Cheatham

(57) ABSTRACT

A deskew buffer 410 arrangement in a CDMA receiver allows for accurate combining of symbols from a plurality of demodulator fingers, 402 and 404, without any symbol losses when the data rate is changed. A single deskew buffer 410 is coupled to a plurality of demodulator fingers, each of which demodulate an assigned multipath. The symbols are written into the deskew buffer 410 according to a PN count value modified by a predetermined bit pattern. The demodulator finger is able to demodulate a plurality of data rates corresponding to a plurality of Walsh lengths. Each data rate is assigned a corresponding deskew index. The PN count value represents an address within the deskew buffer 410. The lower bits of the PN count, where the number of bits corresponds to the deskew index, are truncated and replaced with the predetermined bit pattern. In one embodiment the predetermined bit pattern is all ones.

13 Claims, 7 Drawing Sheets

SYSTEM AND METHOD OF DESKEW BUFFERING SIGNALS

BACKGROUND

I. Field of the Invention

The present invention relates to wireless communications. More particularly, the present invention relates to a novel and improved system and method of deskew buffering signals in multiple rate communication systems.

II. Description of the Related Art

A mobile receiver in a portable communication system operates in an environment that subjects the receive signal to numerous degradations. The signal transmitted from a signal source is subject to numerous conditions, such as attenuation, interference, scattering, and reflections, prior to arrival at a receiver. The receiver must be able to recover the signal in spite of all these degradations in order for a successful communication link to be established.

Structures, such as buildings, and surrounding terrain, including walls and hillsides, contribute to the scattering and reflection of the transmitted signal. The scattering and reflection of the transmit signal results in multiple signal paths from the transmitter to the receiver. The contributors to the multiple signal paths change as the receiver moves. FIG. 1 shows a block diagram of a wireless communication system. A wireless telephone system is provided only as an exemplary embodiment.

In an exemplary embodiment, the wireless communication system may be a system such as a Code Division Multiple Access (CDMA) wireless system, consistent with "Telecommunications Industry Association (TIA)/Electronics Industries Association (EIA)/IS-2000 STANDARDS FOR CDMA2000 SPREAD SPECTRUM SYSTEMS" referred to as "the cdma2000 standard." In alternate embodiments, the system may be a system consistent with the "TIA/EIA/IS-95 MOBILE STATION-BASE STATION COMPATIBILITY STANDARD FOR DUAL-MODE WIDEBAND SPREAD SPECTRUM CELLULAR SYSTEM," hereinafter referred to as "the IS-95 standard," or other systems such as described by "ANSI J-STD-015 DRAFT STANDARD FOR W-CDMA (WIDEBAND CODE DIVISION MULTIPLE ACCESS) AIR INTERFACE COMPATIBILITY STANDARD FOR 1.85 TO 1.99 GHz PCS APPLICATIONS" referred to as "W-CDMA," or other systems generally referred to as High Data Rate (HDR) systems.

A mobile phone 110 operating in a wireless communication system, such as an IS-95 system, uses radio waves to communicate with a base station 120. The base station 120 is identified by an antenna, although in reality the base station hardware would not be immediately located with the antenna. The base station 120 antenna may be located on a building 122 or may be located on an antenna tower. Although only one base station 120 is shown, the mobile phone 110 may simultaneously communicate with more than one base station 120. Transmissions from the base station 120 to the mobile phone 110 ideally traverse a single path, but in reality traverse multiple paths.

Terrain or a structure 130 may obstruct the signal path from the base station 120 to the mobile phone 110. The structure 130 that shadows the mobile phone 110 contributes to slow fade variations of the received signal power. Multiple signal paths from the base station 120 to the mobile station 110 occur because of reflections and scattering of the transmitted signal. Alternate signal paths may occur due to reflections off of structures 142, trees 144, and vehicles 146 that are sufficiently near the mobile phone 110. The objects that contribute to the multiple signal paths are centered about the mobile phone 110 in a radius that is proportional to the receive signal wavelength.

A mobile phone operating in a wideband system, such as a CDMA phone system, utilizes the signal bandwidth to its advantage when demodulating the received multipath signals. A coherence window is defined as the minimum time frame that can be discriminated. The coherence window is inversely proportional to the signal bandwidth. For a mobile phone operating in an Advanced Mobile Phone System (AMPS) that utilizes 30 KHz wide channel bandwidths, the coherence window is on the order of 1/(30 KHz)=30 uS. A mobile phone operating in a CDMA system that utilizes a 1.23 MHz channel bandwidth has a coherence window on the order of 1/(1.23 MHz)=800 nS. Thus, the mobile phone in an AMPS system can discriminate between multipath signals having a temporal spacing greater than 30 uS, while a mobile phone operating in a CDMA system can discriminate between multipath signals having a temporal spacing greater than 800 nS.

The ability to discriminate between multipath signals that are in close temporal spacing is used to improve signal quality. A CDMA receiver implements a plurality of demodulating fingers as a RAKE receiver. Each of the demodulating fingers is able to demodulate a multipath signal independent of the other fingers. The signals are then coherently combined in order to improve signal quality and reduce the effects of non-coherent noise. Since each finger tracks a different multipath signal, the demodulated signals at any instant are temporally offset from one another. The temporal offset must be compensated prior to coherent combining of the signals.

In order to temporally align all finger outputs, some type of deskew buffering configuration is required. What is needed is a deskew buffer configuration that enables efficient temporal alignment of the signals while using a minimum of resources and providing accurate signal buffering under all operating conditions.

SUMMARY

The present embodiments disclose a novel and improved system and method of deskew buffering signals that minimizes or eliminates data loss at data rate change boundaries.

In one embodiment a demodulator finger is coupled to a deskew buffer. The demodulator finger receives a multipath signal and extracts a symbol from the signal. The demodulator finger has a PN counter that is used to generate a deskew buffer address. The deskew buffer address is modified by truncating a number of lower bits on the address and replacing the lower bits with a predetermined bit sequence. Alternatively, the number of lower bits may be logically AND'ed or OR'ed with a predetermined bit sequence. The symbol is written to the deskew buffer according to the modified deskew buffer address. The predetermined bit sequence is all ones in an embodiment and is all zeros in another embodiment. The number of lower bits that is truncated is related to a deskew index that corresponds to a data rate that is received. Each data rate uses a different Walsh length.

The embodiment may include a plurality of demodulator fingers. Each demodulator finger has a PN counter and is coupled to an independent deskew buffer. A combiner is coupled to all of the deskew buffers. A first demodulator finger is assigned to an earliest arriving multipath signal. Each of the additional demodulator fingers is assigned to one of a plurality of delayed multipath signals. Each demodulator finger demodulates symbols and uses their respective PN counters to generate a deskew buffer address. All of the deskew buffer addresses are modified according to the same deskew index and predetermined bit sequence. Each of the demodulator fingers writes the symbol in the deskew buffer location of their respective deskew buffers. The symbols are then read from each of the deskew buffers and summed in the combiner.

In an alternative embodiment, a plurality of demodulator fingers is coupled to a single deskew buffer. Each of the demodulator fingers has a PN counter and is assigned to one of a plurality of multipath signals. One of the plurality of demodulator fingers is assigned to an earliest arriving multipath signals. The demodulator finger assigned to the earliest arriving multipath signal demodulates the signal to extract the symbol. The demodulator finger uses the PN count to generate a deskew buffer address. The deskew buffer address is modified according to the deskew index and predetermined bit sequence as described above. The earliest arriving symbol is then written into the deskew buffer location determined by the modified deskew buffer address.

Each of the demodulator fingers that are not assigned to the earliest arriving multipath signal are assigned to one of a plurality of delayed multipath signals. Each of the plurality of demodulator fingers extracts a delayed symbol and uses their respective PN counters to generate a deskew buffer address. The deskew buffer address is modified in the same manner as was used for the earliest arriving symbol. Each demodulator finger, in the order of the time of arrival of the delayed multipath signals, reads the contents in the modified deskew buffer address, adds the delayed symbol, and writes the updated value back to the modified deskew buffer address.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
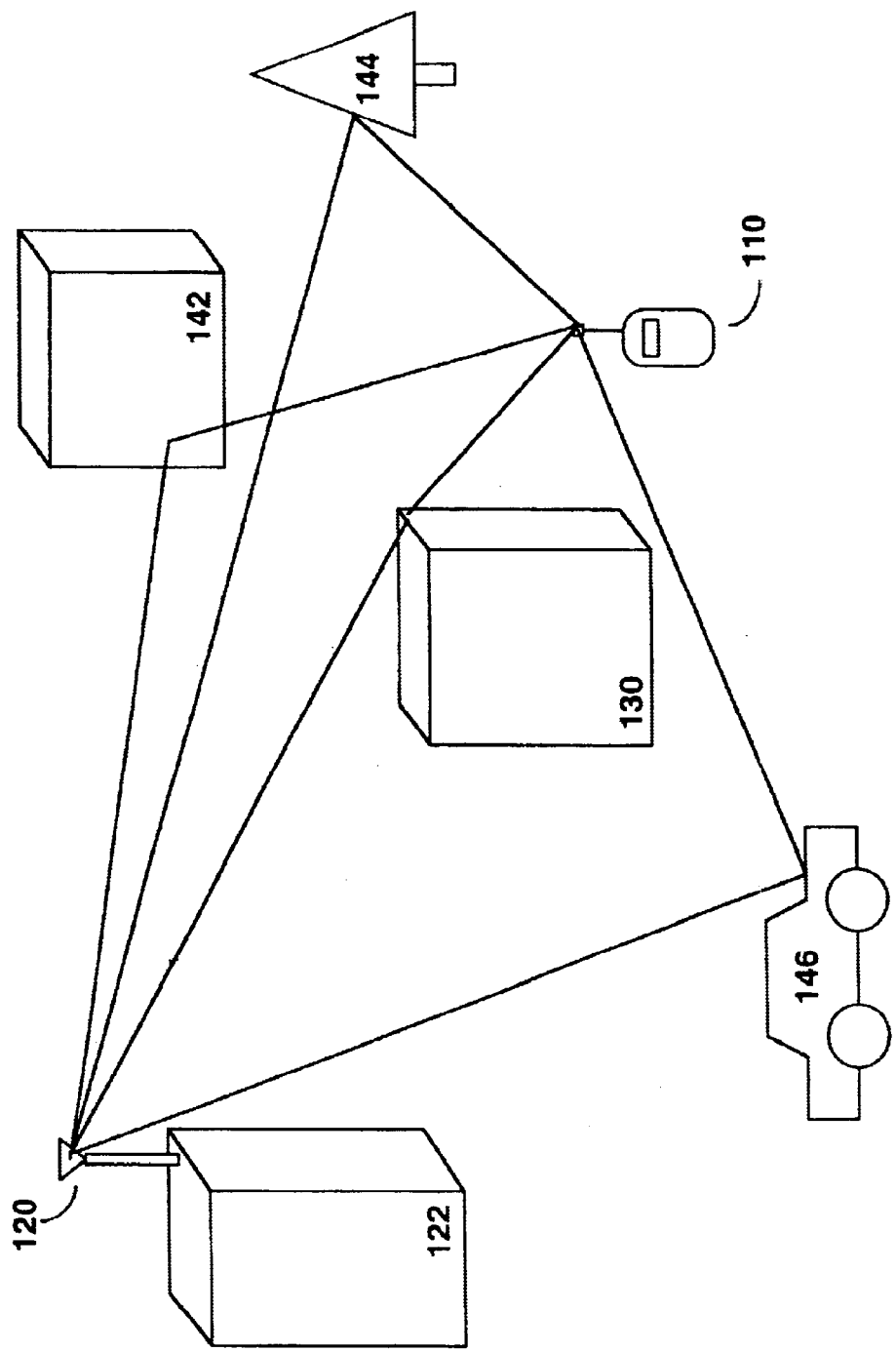
FIG. 1 is a diagram of a mobile phone operating environment.
Figure 2:
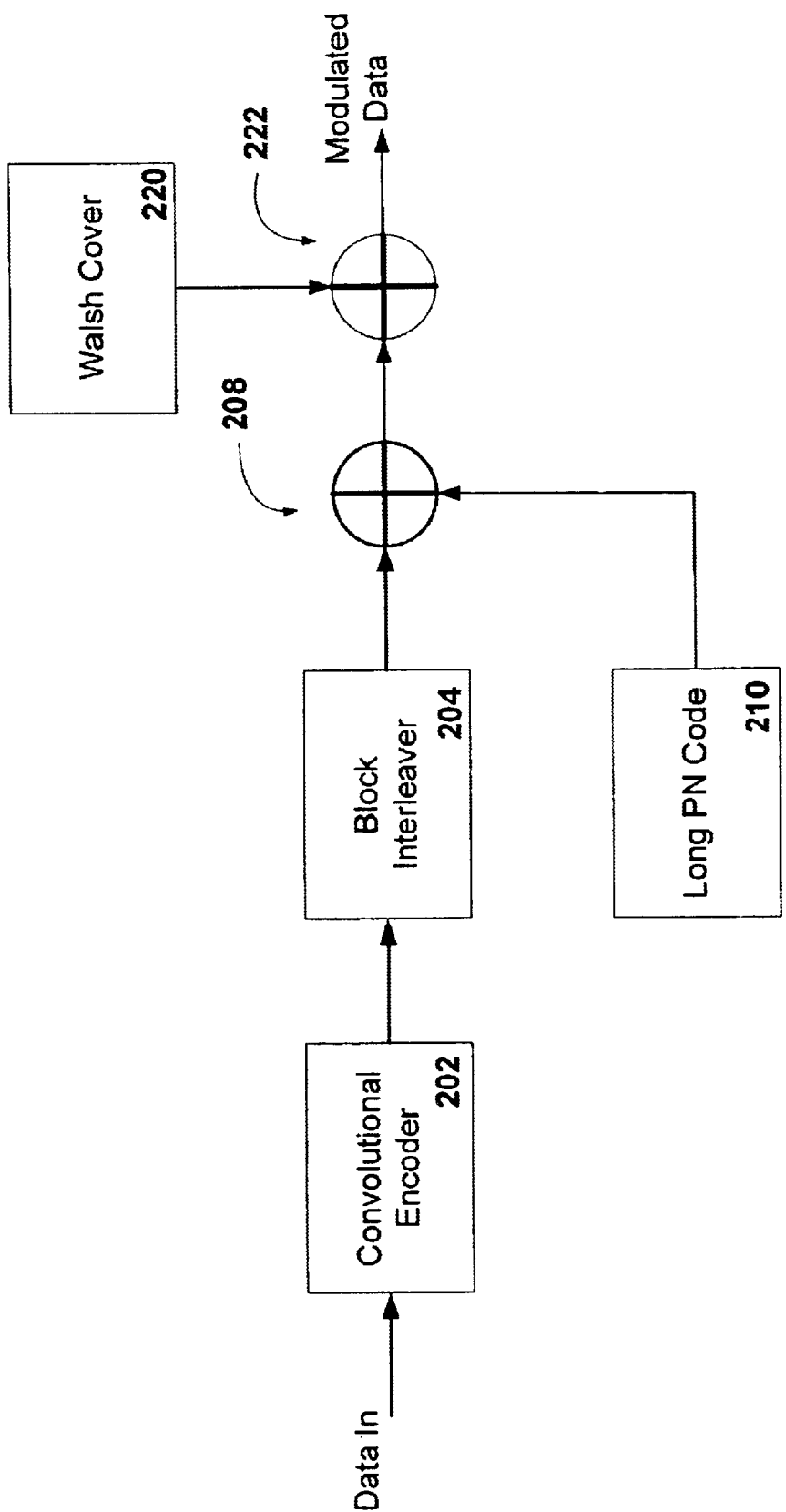
FIG. 2 is a block diagram of forward channel generation in a CDMA system.

FIG. 2 is a block diagram of forward channel generation in a CDMA system such as one used in IS-95. Digitized data is input to a convolutional encoder 202. The digitized data may represent digitally encoded voice signals or may represent data that is provided in digital form or is digitized using an Analog to Digital Converter (ADC). The digitized data may be provided to the convolutional encoder 202 at a constant data rate or at a variable data rate.

The convolutional encoder 202 is used to encode the data signals to allow for forward error correction (FEC) at the receiver. The complexity of the encoding process, dependent on an encoder constraint length, relates to the amount of coding gain achieved at the convolution encoder 202. A higher coding gain results in a better bit error rate (BER) at the receiver using the same ratio of energy per bit to noise. A predetermined BER can be maintained at the receiver using a lower transmit power when the signal is convolutionally encoded. The encoded output of the convolutional encoder 202 is coupled to a block interleaver 204.

The block interleaver 204 is used to shuffle the order of the convolutionally encoded data bits. The block is arranged as a matrix of M rows and N columns. M and N are determined by the specification, but are chosen to allow one complete 20 mSec frame to be interleaved within one block. Interleaving is used to combat burst errors such as are created by multipath signals. In a wireless communication system, the mobile wireless receiver receives signals that are subjected to many varying paths. The multipath signals result in signal fades that cause burst errors. Shuffling the transmit signal in an interleaver allows the burst errors to be separated at the receiver following de-interleaving. The interleaved signal is coupled from the output of the block interleaver 204 to one input of an exclusive or (XOR) stage 208.

The XOR stage 208 receives input signals from the block interleaver 204 and a long PN code generator 210. The resultant output is a scrambled version of the data. The long PN code is generated from an order 42 polynomial and operates at the chip rate. The output of the block interleaver 204 does not operate at the chip rate, but rather at the data rate scaled by the convolutional encoder 202 rate, known as the symbol rate. To compensate for the differing rates of the symbol rate and the long PN code, the long PN code 210 is decimated prior to coupling to the XOR 208. The XOR 208 output is a randomized version of the interleaved output signal. The XOR 208 output is coupled to an input of a second XOR stage 222.

A Walsh code generator 220 is coupled to a second input of the second XOR 222. The output of the second XOR 222 is the modulated data at the chip rate that is encoded, interleaved, and spread. The second XOR 222 operates to spread each bit of the encoded signal using a Walsh code. As an example, when the code rate is 19200 symbols per second and the Walsh code is 64 bits in length, the resultant modulated output is a signal at 1.2288 million chips per second (Mcps). The modulated output is then further masked using a short PN sequence (not shown) that is used to identify a particular base station or sector of a base station.

A CDMA communication system, such as one operating within IS-95, may incorporate other signal processing stages within the forward channel generation path. These additional blocks may include power control bit puncturing, and quadrature modulation. These stages are not shown in FIG. 2 for purposes of clarity. FIG. 2 is provided to illustrate the level of signal processing performed in CDMA forward channel signal generation and is not intended to provide an exhaustive description of available forward channel signal processing stages.

Figure 3:
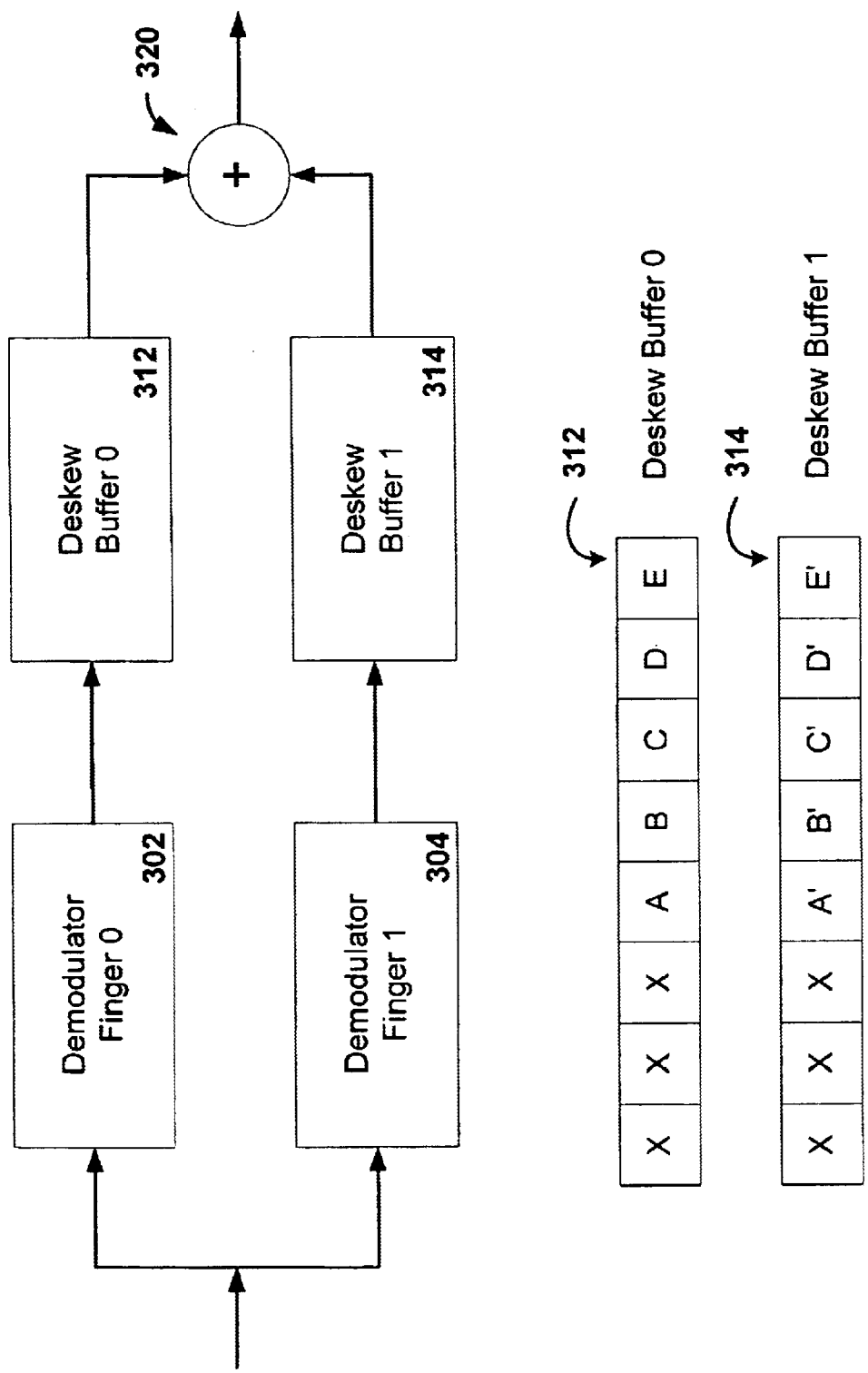
FIG. 3 is a block diagram of a demodulator and deskew buffer embodiment.

A receiver in a CDMA system must be capable of demodulating the forward channel in order to recover the transmitted data. As discussed earlier, the coherence window of a CDMA signal is on the order of 800 nS. Therefore, a CDMA receiver may implement a number of demodulating fingers and assign each of the demodulating fingers to a separate multipath signal. The demodulated data from the fingers can be coherently summed to increase the signal power without increasing the amount of non-coherent noise power. An exemplary embodiment of a CDMA demodualtor having two demodulating fingers is shown in a block diagram in FIG. 3. Although only two fingers are shown in FIG. 3, it will be understood that any number of fingers may be implemented in a CDMA receiver and that the number of fingers and their assignment is a design task that is independent of the design of deskew buffering the signals from each of the demodulating fingers.

A first demodulating finger is labeled demodulating finger 0 302. The main functions of each finger are quadrature despreading of the input signal, uncovering the forward link Walsh cover, frequency tracking the signal in a single path, time tracking the signal for a single path, and signal level estimating and lock detecting. Each demodulating finger has its own timing reference, PN boundary, symbol boundary, and pilot PN generator.

Signal despreading is performed independently in each finger. The pilot PN generator within the finger allows the demodulating finger to slew, adjusting the starting point of the demodulating finger's pilot PN sequence to correspond with that of a single path. The pilot signal from the base station is used as a time reference.

The output of the first demodulator finger 302 is coupled to a first deskew buffer 312. In the embodiment shown in FIG. 3, each demodulator is coupled to a deskew buffer. Following the demodulating finger where the signal is quadrature despread and Walsh uncovered, the data is queued in a deskew buffer. The deskew buffer 312 aligns the demodulated data. The output of the deskew buffer 312 is coupled to a combiner 320 that coherently sums the aligned demodulated signals.

The embodiment of FIG. 3 shows a similar configuration for the second demodulation path. A second demodulator finger 304 receives the same composite signal that is provided to the first demodulator finger 302. The composite signal may be composed of a plurality of multipath signals. The second demodulator finger 304 tracks and demodulates a different signal path than is tracked and demodulated in the first demodulator finger 302. The output of the second demodulator finger 304 is coupled to a second deskew buffer 314. The output of the second deskew buffer 314 is coupled to the combiner 320. It can be seen that any number of demodulator fingers con be implemented in the same structure shown in this embodiment. Each demodulator finger receives the same composite signal composed of multipath signals, tracks an individual signal path, aligns the demodulated symbols in an independent deskew buffer, and coupled the deskew buffer to a common combiner. Additional demodulator fingers may be dedicated to signal searching or may be assigned to signal paths originating from alternative sources. The demodulated symbols from these additional demodulator fingers may not be combined with the demodulated symbols from the first signal source. As an example, a demodulator finger tracking the pilot signal from a neighboring base station would not ordinarily provide the demodulated symbols to the combiner.

The contents of the deskew buffers for a particular instance are shown in FIG. 3. At an arbitrary instant in time the first demodulator finger 302 will be demodulating symbols from a particular signal path. The demodulated symbols are then written into a deskew buffer 312. Suppose the demodulator finger 302 has already demodulated some symbols, denoted by the X's. The next demodulated symbol, denoted A, is written into the next deskew buffer location. The demodulator finger uses a PN counter to determine the offset of the symbol relative to the beginning of the PN sequence and to determine which location in the deskew buffer to write the symbol. The demodulator finger 302 continues to demodulate symbols and writes them into the next higher buffer location until the end of the deskew buffer 312 is reached. The number of locations in the deskew buffer 302 is predetermined to correspond to a multiple of the coherence window. The number of symbols that can be saved in the deskew buffer 312 is usually chosen to be greater than the time period between the earliest arriving detectable signal path and the latest arriving detectable signal path. Additionally, the deskew buffer 312 depth is chosen such that the short PN cycle time, also known as the PN circle, is an integer multiple of the (symbol time X deskew buffer depth). When the PN circle is an integer multiple of the time required to fill the deskew buffer, each location in the deskew buffer represents a particular PN offset. Thus, each finger can align the demodulated symbol in the deskew buffer using a PN count. The embodiment shown in FIG. 3 implements a deskew buffer depth of eight locations. The deskew buffer 302 may be configured as a circular buffer to allow the contents at any time to represent a moving window of the symbols demodulated during the time frame represented by the number of buffer locations. For purposes of illustration, assume the signal path demodulated in the first demodulator finger 312 represents the earliest arriving signal.

The second demodulator finger 304 tracks and demodulates a later arriving signal path. The demodulated symbols from the later arriving signal path are stored in the second deskew buffer 314. The second demodulator finger 304 uses its PN counter to establish the offset of the signal path relative to the beginning of the PN sequence. The second demodulator finger 304 then uses the PN count to position the demodulated symbol in the second deskew buffer 314 such that it aligns with the corresponding symbol in the first deskew buffer 312. It can be seen, by examining the contents in the second deskew buffer 314, that a symbol, A', demodulated in the second demodulator finger 304 is written in the same relative position in the second deskew buffer 314 as the corresponding symbol, A, written in the first deskew buffer 312. Thus, the demodulated symbols from each demodulator finger are aligned in their respective deskew buffers using a PN counter that tracks the PN count relative to the beginning of the PN sequence.

The aligned contents are read from the deskew buffers, 312 and 314, using a system time reference. System time is derived from the pilot and sync channels and is maintained across sector and base station boundaries. The symbols are read from the deskew buffers according to a system time reference that is approximately six symbol periods following the earliest arriving signal path. Thus, the symbol A is read from the first deskew buffer 312 approximately six symbol periods after it is written into the deskew buffer 312. Symbol A' is read from the second deskew buffer 314 using the same system time reference. Thus symbol A' is read approximately six symbol periods after symbol A is written to the first deskew buffer 312. The use of an absolute system time reference allows all of the symbols from the multiple paths to be combined coherently.

Figure 4:
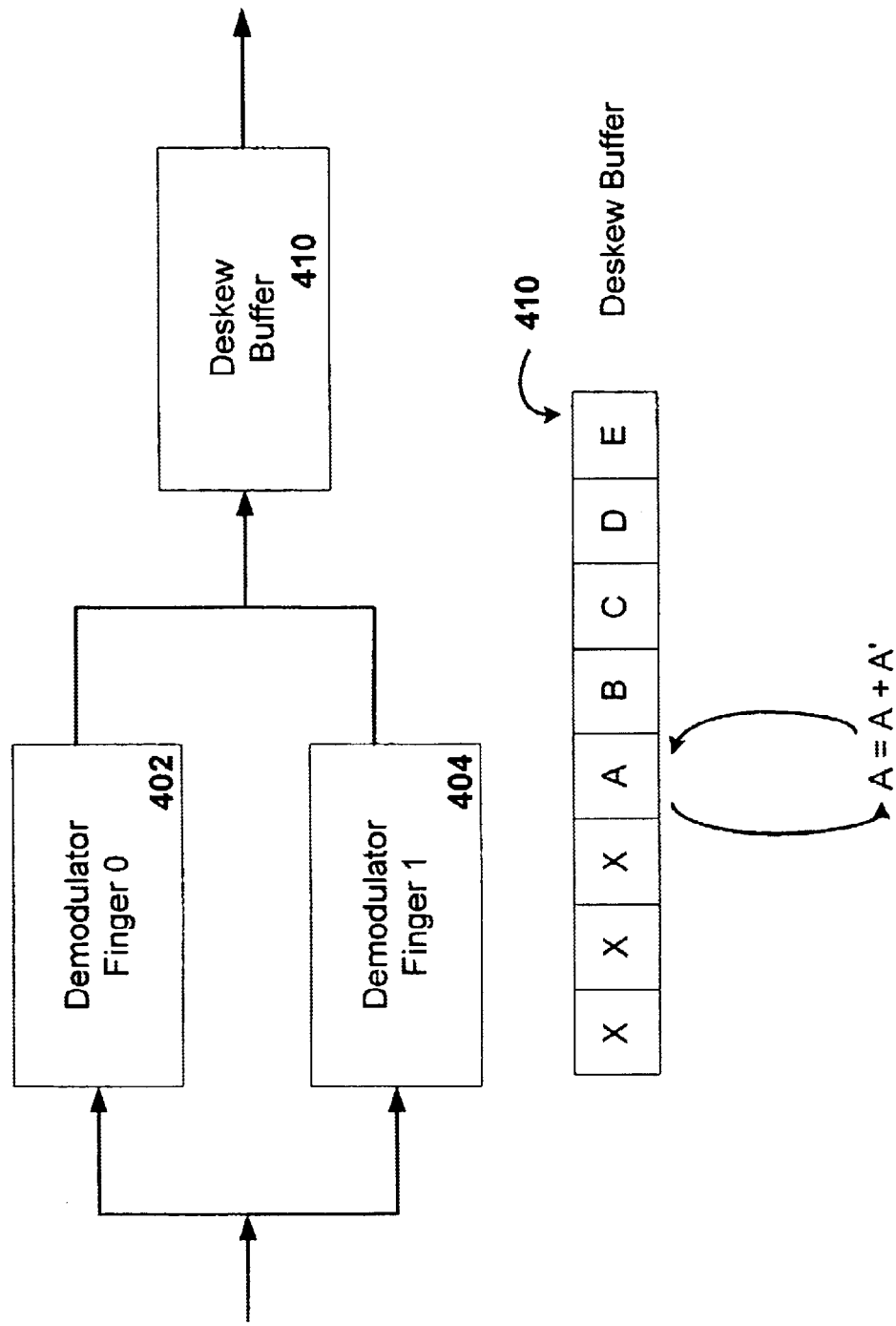
FIG. 4 is a is a block diagram of a demodulator and deskew buffer embodiment.

FIG. 4 represents an embodiment of demodulator fingers, 402 and 404, interfaced to a single deskew buffer 410. Each of the demodulator fingers, 402 and 404, operates to demodulate an independent signal path. For explanation purposes, assume that demodulator finger 0 402 is assigned to demodulate the earliest arriving signal path. The demodulated symbols from demodulator finger 0 402 are written into the deskew buffer 410. The demodulator finger 0 402 uses its independent PN count to align the demodulated symbol in the deskew buffer 410. Since the demodulated symbols from demodulator finger 0 402 represent symbols from the earliest arriving signal path, the demodulated symbols overwrite previously aligned symbols in the deskew buffer 410. This does not create any loss of information as long as the symbol is read from the deskew buffer 410 prior to overwriting by the new symbol.

A second demodulator finger 404 is assigned to track and demodulate symbols from a later arriving signal path. Demodulator finger 1 404, and any additional demodulator fingers that demodulate later arriving signal paths, use their independently generated PN counts to align the demodulated symbol with the location of the symbol from the earlier arriving symbol path. The later demodulated symbol is then added to the earlier arriving symbol and the result is written into the deskew buffer 410 location that originally held the earlier arriving symbol. The contents of the single deskew buffer 410 hold the coherently summed symbols from the plurality of demodulator fingers. The system time reference is used to read the contents out of the deskew buffer 410. The system time reference is approximately six symbol periods after the earliest symbol is written into the deskew buffer 410. However, the deskew buffer contains the symbol that is the coherent sum of all demodulator fingers. Thus, when the single deskew buffer 410 configuration is used no subsequent combiner stage is required. Instead, the combining is performed as each symbol is demodulated and written into the deskew buffer 410.

The modern wireless communication systems, such as those conforming to IS-95C and CDMA2000, provide for variable data rates while maintaining the same signal bandwidth. Variable data rates are supported within a single chip rate of 1.2288 Mcps by varying the Walsh code length used to spread the symbols. A CDMA wireless system configured in accordance with the earlier IS-95B specification utilized a constant symbol rate of 19200 code symbols per second and a fixed Walsh code length of 64 bits. A 1.2288 Mcps rate can support data rates from 307,200 symbols per second down to 2400 symbols per second by varying the Walsh length from 4 to 512. Table 1 shows the relationship of the Walsh length to the symbol rate when using a constant 1.2288 Mcps rate.

TABLE 1

| Chip Rate (Mcps) | Walsh Length | Symbol Rate (sym/s) |
| --- | --- | --- |
| 1.2288 | 4 | 307200 |
| 1.2288 | 8 | 153600 |
| 1.2288 | 16 | 76800 |
| 1.2288 | 32 | 38400 |
| 1.2288 | 64 | 19200 |
| 1.2288 | 128 | 9600 |
| 1.2288 | 256 | 4800 |
| 1.2288 | 512 | 2400 |

In one embodiment of variable data rate transmission using a variable Walsh length, data rates change only at the 20 mS frame boundaries. Additionally, the receiver is provided information as to the data rate in any particular frame. The rate information may be provided on another channel, such as a predetermined control channel. In another embodiment, the receiver is not provided the rate information and the receiver must determine the data rate from the received transmission. The operation of the deskew buffer is not affected by the manner in which the demodulator determines the data rate, provided the demodulator is able to accurately determine the data rate for any transmitted symbol.

The depth of the deskew buffer must accommodate the highest data rate implemented by the system. The time of arrival of the various multipath signals doesn't change with the data rate, but the number of symbols demodulated within the multipath time window is proportional to the data rate. In one embodiment, a deskew buffer depth of eight symbols is sufficient to capture all multipath signals in a system using a 19200 symbol per second rate and a Walsh length of 64 bits. However, when the chip rate is maintained and the Walsh length is reduced to four bits, the symbol rate is 307,200 symbols per second and the deskew buffer depth must be increased to 128 symbols to capture the same multipath time window.

In a variable data rate embodiment the deskew buffer depth is 128 symbols. The system time reference used to read symbols out of the deskew buffer does not change with the data rate and instead is maintained at approximately 384 chips following the earliest arriving symbol. The complete deskew buffer depth will only be used for the highest data rate. Some of the deskew buffer locations will not be written into when lower data rates are used.

As an example, the demodulating symbols at the highest data rate results in all of the deskew buffer locations being used. In the embodiment described above, all 128 locations will be used at the highest data rate. When the data rate changes to one half of the highest data rate, one half of the deskew buffer locations are sufficient to represent the number of symbols in the same time frame. Therefore, only one half of the deskew buffer locations will be written into using the lower data rate. Similarly, when the data rate is further reduced, even fewer locations within the deskew buffer will be written into. The demodulator finger can write its contents into the deskew buffer using a number of methods.

Figure 5:
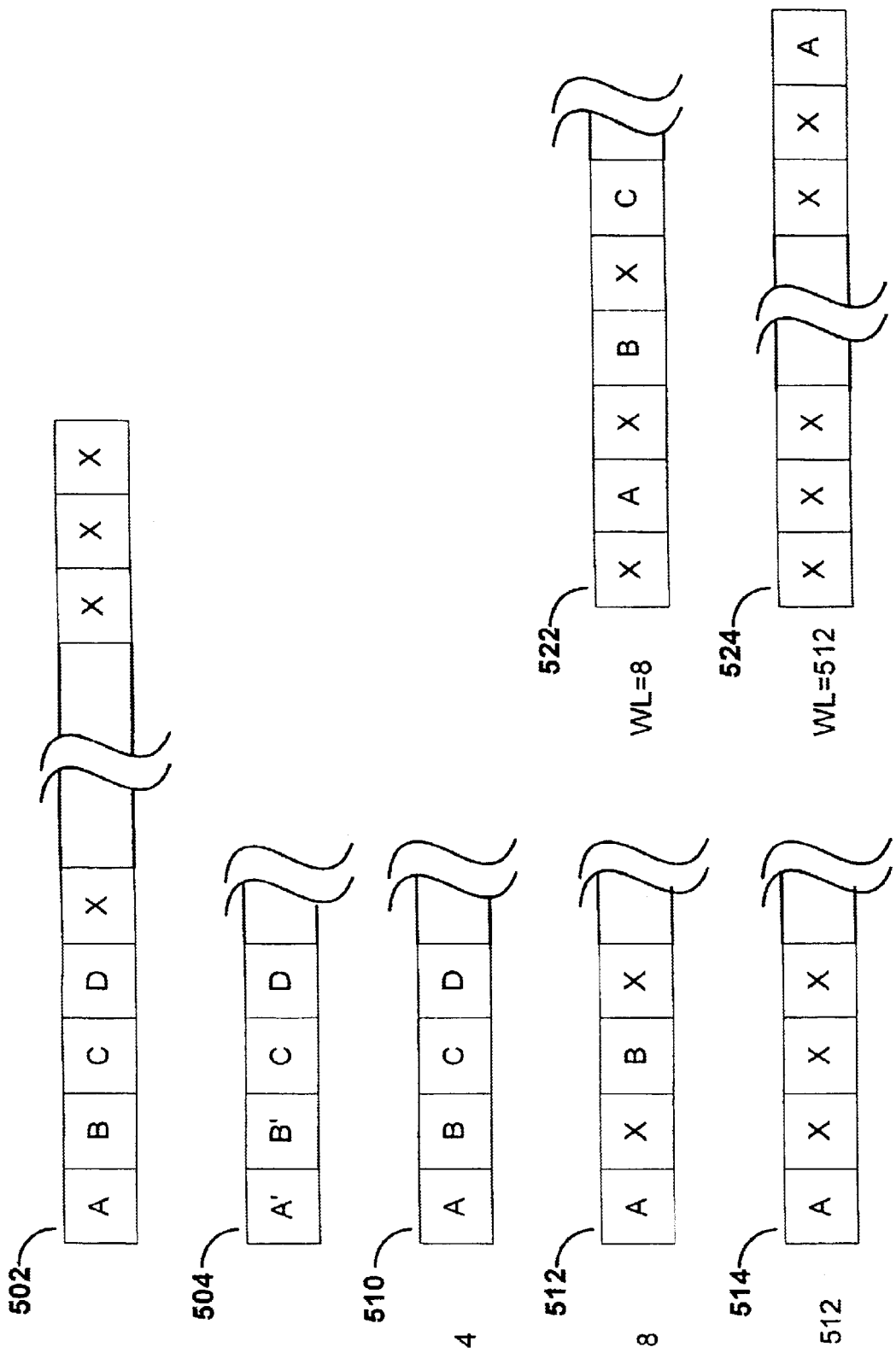
FIG. 5 is a diagram of deskew buffer contents.

In a first embodiment, the first location in the deskew buffer corresponds to one of a predetermined number of offsets in the PN circle. The earliest demodulated symbol is then written into the first deskew buffer location and subsequently demodulated symbols are written into the next higher deskew buffer location. In a deskew buffer having 128 locations, with the locations identified from 0-127, 00H-7FH, the earliest demodulated symbol is written into location 00H and the following symbol is written into location 01H. As stated earlier, when the highest data rate is received, the deskew buffer writes in all locations. When one half the highest data rate is received, the earliest arriving symbol is still written in location 00H and subsequent symbols are written into the next higher locations, but only one half of the locations are written into before the deskew buffer is cycled back to location 0. When the lowest data rate is used, a demodulated symbol is only written into location 0. A first set of data 502 written to the deskew buffer is shown in FIG. 5. Subsequent data 504 from the next multipath window is aligned with the first location in the deskew buffer regardless of data rate.

In a second embodiment, the demodulated symbols are written to a deskew buffer address having the lower bits truncated and replaced by zeros. The number of bits truncated from the deskew buffer address is determined according to a deskew index that corresponds to the received data rate. Effectively, the lowest bits corresponding to the deskew index are AND'ed with zero. The deskew index may be defined to be zero for the highest data rate and increase by one for each successively decreasing data rate. Therefore, the deskew index for the highest data rate, 307,200 symbols/ sec from Table 1, is zero and no bits are truncated from the deskew buffer address prior to writing the demodulated data to the deskew buffer. The deskew index for the 9600 symbols/sec data rate is five, thus five bits would be truncated from the deskew buffer address and replaced by zeros prior to writing the demodulated data to the deskew buffer.

In the second embodiment, a first set of symbols 510 using the maximum data rate uses every deskew buffer location. A second set of symbols 512 received with a lower data rate corresponding to a deskew index of two uses only one half the deskew buffer locations. Truncating the deskew buffer address and replacing the truncated bits with zeros results in use of only alternating locations when the deskew index is two. Similarly, at the lowest data rate shown in Table 1, the deskew index is seven. In the second embodiment, the lowest seven bits of the deskew buffer address are truncated and replaced by zeros. Thus, the demodulated symbol is written in location 0 of the deskew buffer. In the second embodiment, the first symbol demodulated in the multipath window is always aligned in the first deskew buffer location regardless of the data rate.

In a third embodiment, the demodulated symbols are written to a deskew buffer address having the lower bits truncated and replaced by ones. The number of bits truncated corresponds to the deskew buffer index as it did in the second embodiment. In the third embodiment, the lowest bits corresponding to the deskew index are OR'ed with ones. The highest data rate uses all deskew buffer locations since the deskew index is zero and no deskew buffer address bits are truncated. When the data rate is reduced to one half the maximum data rate, the corresponding deskew index is one. In the third embodiment, a deskew index of one results in the lowest bit of the deskew buffer address being OR'ed with a one. Thus, only alternate locations in the deskew buffer are used, but in contrast to the second embodiment, the demodulated symbol is positioned at the upper end of the address location. A group of demodulated symbols having a deskew index of one is shown in FIG. 5 as 522. Similarly, where the deskew index is seven, the lowest seven bits of the deskew buffer address are replaced by ones. This results in the demodulated symbol being written into the highest location in the deskew buffer 524.

Figure 6:
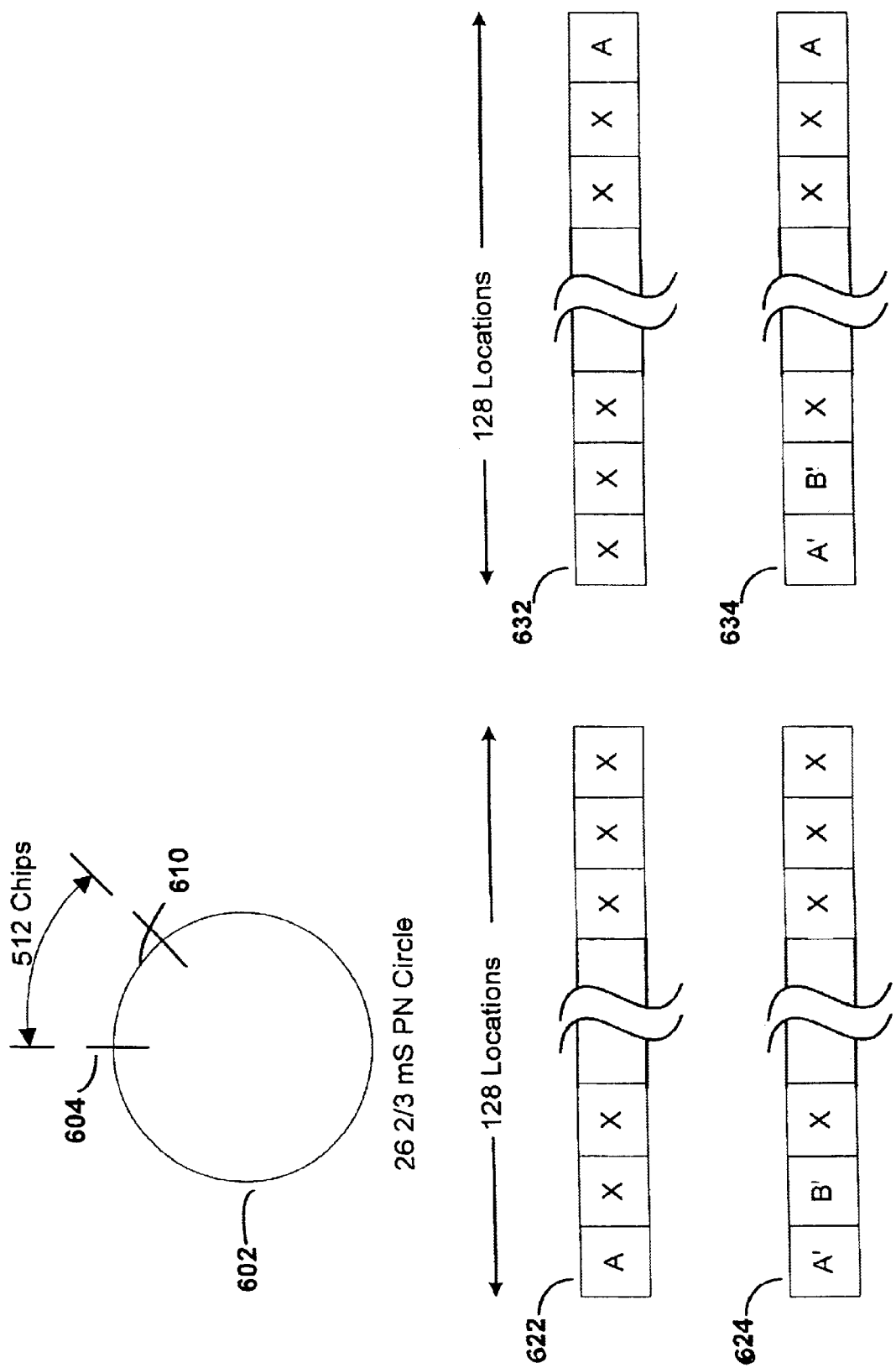
FIG. 6 is a diagram of a deskew buffer contents following a data rate change.

FIG. 6 shows the contents of a deskew buffer before and after a data rate change. One multipath window 610 of 512 chips is shown on the PN circle 602. The PN rollover boundary 604 is shown at the top of the PN circle 602. The figures show contents of a deskew buffer using the second and third embodiment where the data rate changes from the lowest available data rate to the highest available data rate. As discussed earlier, a data rate change may only occur at the frame boundary. To promote clarity in the description, assume the frame boundary occurs at the same time as the PN rollover boundary 604. The deskew buffer address is determined by a PN counter that indicates the last chip of the corresponding symbol in chip time. The symbol is aligned to a corresponding location in the deskew buffer using the PN counter.

Under the worst case conditions, the data rate is changing from the lowest data rate to the highest data rate. The Walsh length used in the lowest data rate is 512. Therefore, in the defined 512 chip multipath window 610 only one symbol is demodulated at the lowest data rate. The contents of the deskew buffer before and after the data rate change, using the second embodiment, are shown in 622 and 624.

Prior to the data rate change the data is received at the lowest data rate. The lowest data rate corresponds to a deskew index of seven. In the second embodiment, the lowest deskew buffer address bits are logically AND'ed with zeros. The deskew index represents the number of bits to be logically AND'ed with zero. Therefore, in the second embodiment, the symbol demodulated in a multipath window 610, using the lowest data rate, is written into location 0 of the deskew buffer. The contents of the deskew buffer at the lowest data rate 622 show the demodulated symbol, A, written into location 0 of the deskew buffer and previously demodulated symbols, denoted by X, written into the remaining locations.

The deskew index changes to zero following the change to the highest data rate. The Walsh length at the highest data rate is four. Therefore, the next symbol is demodulated after only four chips. The symbol is demodulated at the start of a new multipath window so the demodulator finger writes the demodulated symbol to deskew buffer location 0. No bits in the deskew buffer address are changed since the deskew index is zero. The contents of the deskew buffer following the change to the highest data rate 624 shows the first demodulated symbol, A', written in location 0 and the following symbol, B', written into location 1. The remaining locations are shown as X to show previous buffer contents. These buffer locations are overwritten once the corresponding symbol is demodulated.

As discussed above, the symbols are read from the deskew buffer according to a system time reference. The system time reference used to read out the contents of the deskew buffer follows the time the earliest arriving symbol is written into the buffer by approximately 384 chips, or six symbols when the Walsh length is 64. But using the second embodiment, location 0 in the deskew buffer is overwritten after only four chips. Thus the second embodiment results in the loss of a symbol under worst case data rate changes. It can be seen that the second embodiment results in a loss of the symbol demodulated in the lowest data rate when the data rate changes to any faster rate.

The contents of the deskew buffer prior to the data rate change 632 using the third embodiment show the demodulated symbol written into the highest location, location 127, in the deskew buffer. Recall that the deskew buffer location is determined by logically OR'ing with 1's the lowest address bits corresponding to the deskew index number. The lowest data rate has a deskew index of seven which results in the lowest seven bits of the deskew buffer address being logically OR'ed with 1's. The result is that the one symbol demodulated at the lowest data rate, A, is written into location 127.

The contents of the deskew buffer following the change to the highest data rate 634 shows the demodulated symbols being written to the deskew buffer starting at location 0. The deskew index is zero at the highest data rate which results in the demodulated symbols being written into the deskew buffer starting at location 0. The contents of the deskew buffer following the data rate change 634 show the symbols demodulated at the high data rate, A' and B', written into locations 0 and 1. The symbol, A, demodulated in the previous multipath window at the lowest data rate, remains in location 127 and is not overwritten by another demodulated symbol until 128 symbols later. The symbols are read out from the deskew buffer approximately 384 chips after first being written into the deskew buffer. It can be seen that the third embodiment results in no symbol loss when changing from a low data rate to a high data rate.

Figure 7:
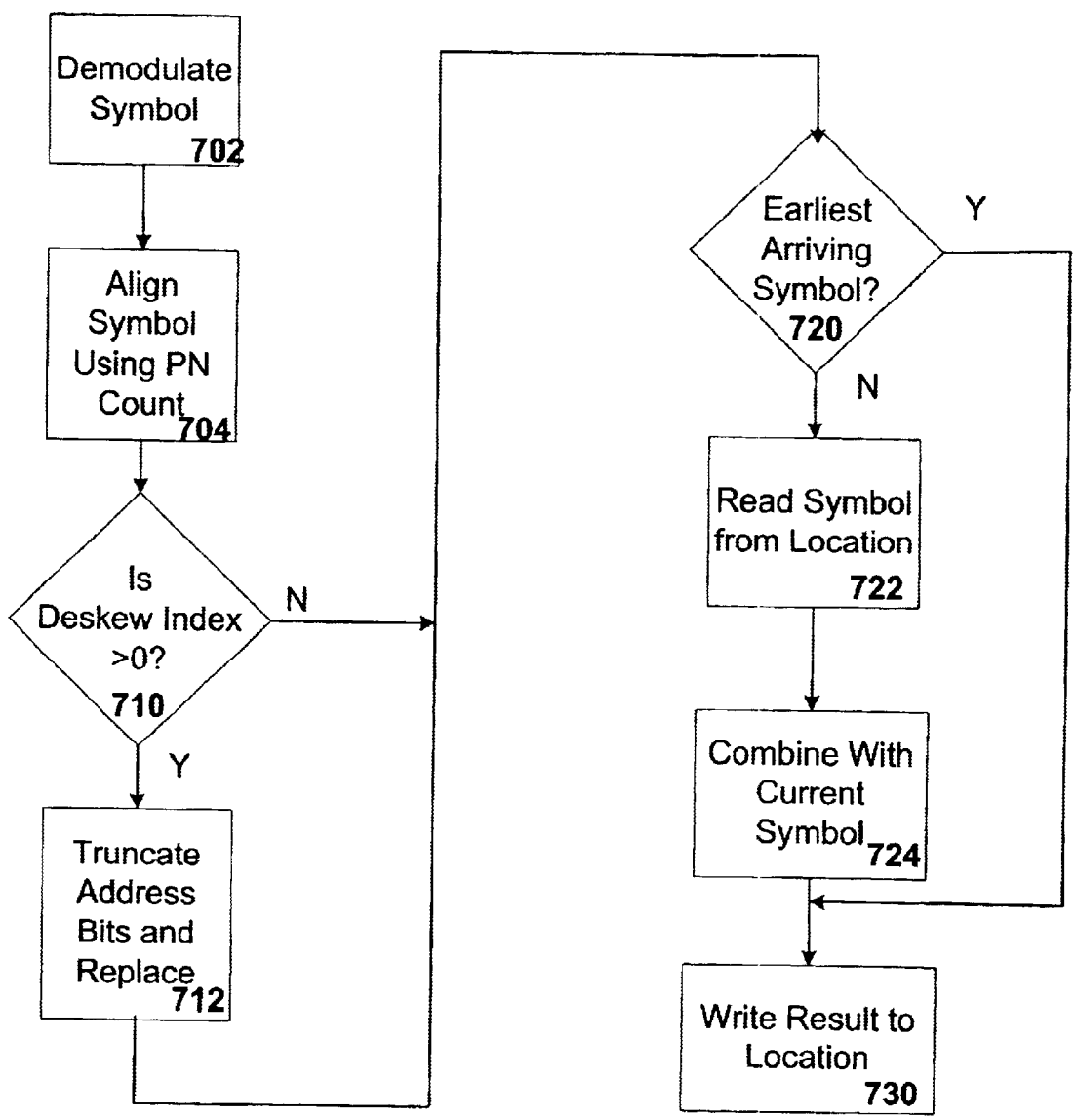
FIG. 7 is a flow chart of a deskew buffering method.

FIG. 7 shows a flow chart of the deskew buffer operation. Signals are received at the receiver and provided to a demodulator finger for demodulation. The signals may be first filtered, amplified, and downconverted prior to application to the demodulator finger. The demodulator finger demodulates the symbol 702 from a single multipath. The symbol is then aligned using a PN count 704. The PN count value is determined within the demodulator finger. The PN count is used to align the symbol with an address in the deskew buffer. The method next checks to see if the deskew index is greater than zero 710.

The deskew index corresponds to the data rate that is being transmitted. Information that allows the receiver to determine the deskew index may be provided by the signal transmitter, such as a base station, on a channel distinct from the channel that carries the data. In one embodiment, the data rate information is transmitted to the receiver on a control channel. If the deskew index is greater than zero, the data rate is lower than the maximum data rate, and the buffer addresses must be modified to allow efficient use of the deskew buffer space. The routine proceeds to block 712 where the deskew buffer address determined by the PN count is truncated and the lower bits are replaced with a predetermined sequence of bits. The number of lower bits truncated is equal to the deskew index. The predetermined sequence of bits is equal to all zeros in one embodiment and is equal to all ones in another embodiment. The routine next determines whether the demodulated symbol is from the demodulator finger assigned to the earliest arriving signal 720. Where the deskew index is zero, the routine proceeds directly to this block 720.

If the symbol is from the earliest arriving signal the routine writes the symbol directly into the deskew buffer in the location determined by the modified deskew buffer address 730. However, if the symbol is not from the earliest arriving signal, at least one other symbol has been previously demodulated and written into the modified deskew buffer location. The routine proceeds to read the symbol from the modified deskew buffer address 722 then combines the read symbol with the demodulated symbol 724. This method allows coherent summing of the aligned finger outputs using a single deskew buffer. The combined symbol is then written into the modified deskew buffer address 730. In this manner, a single deskew buffer may be used to combine the outputs from a plurality of demodulator fingers while accurately buffering the symbols for subsequent stages. The deskew buffer thus provides the demodulated symbols to the subsequent stages regardless of changes in the received data rate.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A system of deskew buffering symbols comprising:
a first demodulator finger adapted to demodulate CDMA signals;
a deskew buffer coupled to the first demodulator finger;
wherein the first demodulator finger has a first PN counter and writes a demodulated symbol value into a deskew buffer location according to a PN count value modified by a predetermined bit sequence;
wherein the first demodulator finger is adapted to demodulate a plurality of data rates, each data rate corresponding to a unique Walsh code length;
wherein each of the plurality of data rates corresponds to a deskew index number; and
wherein the demodulated symbol value is written into the deskew buffer location corresponding to the PN count value having a number of lower bits truncated and replaced by the predetermined bit sequence.

2. A system of deskew buffering symbols comprising:
a first demodulator finger adapted to demodulate CDMA signals;
a deskew buffer coupled to the first demodulator finger;
wherein the first demodulator finger has a first PN counter and writes a demodulated symbol value into a deskew buffer location according to a PN count value modified by a predetermined bit sequence;
wherein the first demodulator finger is adapted to demodulate a plurality of data rates, each data rate corresponding to a unique Walsh code length;
wherein each of the plurality of data rates corresponds to a deskew index number;
wherein the demodulated symbol value is written into the deskew buffer location corresponding to the PN count value having a number of lower bits truncated and replaced by the predetermined bit sequence; and
wherein the number of lower bits truncated from the PN count value corresponds to the deskew index number.

3. A system of deskew buffering symbols comprising:
a first demodulator finger adapted to demodulate CDMA signals;
a deskew buffer coupled to the first demodulator finger;
wherein the first demodulator finger has a first PN counter and writes a demodulated symbol value into a deskew buffer location according to a PN count value modified by a predetermined bit sequence;
wherein the first demodulator finger is adapted to demodulate a plurality of data rates, each data rate corresponding to a unique Walsh code length;
wherein each of the plurality of data rates corresponds to a deskew index number;
wherein the demodulated symbol value is written into the deskew buffer location corresponding to the PN count value having a number of lower bits truncated and replaced by the predetermined bit sequence;
wherein the number of lower bits truncated from the PN count value corresponds to the deskew index number; and
wherein the predetermined bit sequence is all zeros.

4. A system of deskew buffering symbols comprising:
a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

wherein the first demodulator finger is adapted to demodulate a plurality of data rates, each data rate corresponding to a unique Walsh code length;

wherein each of the plurality of data rates corresponds to a deskew index number;

wherein the demodulated symbol value is written into the deskew buffer location corresponding to the PN count value having a number of lower bits truncated and replaced by the predetermined bit sequence;

wherein the number of lower bits truncated from the PN count value corresponds to the deskew index number; and wherein the predetermined bit sequence is all ones.

5. A system of deskew buffering symbols comprising:

a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

wherein the first demodulator finger is adapted to demodulate a plurality of data rates, each data rate corresponding to a unique Walsh code length;

wherein each of the plurality of data rates corresponds to a deskew index number; and wherein the demodulated symbol value is written into the deskew buffer location corresponding to the PN count value having a number of lower bits logically AND'ed with the predetermined bit sequence.

6. A system of deskew buffering symbols comprising:

a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

wherein the first demodulator finger is adapted to demodulate a plurality of data rates, each data rate corresponding to a unique Walsh code length;

wherein each of the plurality of data rates corresponds to a deskew index number;

wherein the demodulated symbol value is written into the deskew buffer location corresponding to the PN count value having a number of lower bits logically AND'ed with the predetermined bit sequence; and wherein the number of lower bits corresponds to the deskew index number and the predetermined bit sequence is all zeros.

7. A system of deskew buffering symbols comprising:

a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

wherein the first demodulator finger is adapted to demodulate a plurality of data rates, each data rate corresponding to a unique Walsh code length;

wherein each of the plurality of data rates corresponds to a deskew index number; and wherein the demodulated symbol value is written into the deskew buffer location corresponding to the PN count value having a number of lower bits logically OR'ed with the predetermined bit sequence.

8. A system of deskew buffering symbols comprising:

a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

wherein the first demodulator finger is adapted to demodulate a plurality of data rates, each data rate corresponding to a unique Walsh code length;

wherein each of the plurality of data rates corresponds to a deskew index number;

wherein the demodulated symbol value is written into the deskew buffer location corresponding to the PN count value having a number of lower bits logically OR'ed with the predetermined bit sequence; and wherein the number of lower bits corresponds to the deskew index number and the predetermined bit sequence is all ones.

9. A system of deskew buffering symbols comprising:

a first demodulator finger adapted to demodulate CDMA signals;

a deskew buffer coupled to the first demodulator finger;

wherein the first demodulator finger has a first PN counter and writes a demodulated symbol value into a deskew buffer location according to a PN count value modified by a predetermined bit sequence;

minimum of one additional demodulator finger, each additional demodulator finger having an associated PN counter, and wherein:

the first demodulator finger is assigned to demodulate a signal from an earliest arriving multipath signal;

each of the additional demodulator fingers is assigned to demodulate one of a plurality of delayed multipath signals;

each additional demodulator finger determines a deskew buffer location according to its PN count value modified by the predetermined bit sequence; and in order of a time of arrival of the delayed multipath signals, each additional demodulator finger reads the symbol from the deskew buffer location, adds the demodulated symbol from the additional demodulator finger to the read symbol value, and writes the sum back to the deskew buffer location.

10. A method of deskew buffering a CDMA signal comprising:

demodulating an earliest arriving signal to extract an earliest arriving symbol in a multirate system having a plurality of Walsh code lengths;

aligning the earliest arriving symbol to a deskew buffer address using a PN count value;

modifying the deskew buffer address;

writing the earliest arriving symbol into the modified deskew buffer address; and wherein modifying the deskew buffer address comprises:
  truncating a number of lower bits of the deskew address corresponding to a deskew index, wherein the deskew index corresponds to a data rate;
  replacing the truncated number of lower bits with a predetermined bit sequence.

11. A method of deskew buffering a CDMA signal comprising:
  demodulating an earliest arriving signal to extract an earliest arriving symbol in a multirate system having a plurality of Walsh code lengths;
  aligning the earliest arriving symbol to a deskew buffer address using a PN count value;
  modifying the deskew buffer address;
  writing the earliest arriving symbol into the modified deskew buffer address;
  wherein modifying the deskew buffer address comprises:
    truncating a number of lower bits of the deskew address corresponding to a deskew index, wherein the deskew index corresponds to a data rate;
    replacing the truncated number of lower bits with a predetermined bit sequence; and
    wherein the predetermined bit sequence is all ones.

12. A method of deskew buffering a CDMA signal comprising:
  demodulating an earliest arriving signal to extract an earliest arriving symbol in a multirate system having a plurality of Walsh code lengths;
  aligning the earliest arriving symbol to a deskew buffer address using a PN count value;
  modifying the deskew buffer address;
  writing the earliest arriving symbol into the modified deskew buffer address;
  wherein modifying the deskew buffer address comprises:
    truncating a number of lower bits of the deskew address corresponding to a deskew index wherein the deskew index corresponds to a data rate;
    replacing the truncated number of lower bits with a predetermined bit sequence; and
    wherein the predetermined bit sequence is all zeros.

13. A method of deskew buffering a CDMA signal comprising:
  demodulating an earliest arriving signal to extract an earliest arriving symbol in a multirate system having a plurality of Walsh code lengths;
  aligning the earliest arriving symbol to a deskew buffer address using a PN count value;
  modifying the deskew buffer address;
  writing the earliest arriving symbol into the modified deskew buffer address;
  wherein modifying the deskew buffer address comprises:
    truncating a number of lower bits of the deskew address corresponding to a deskew index, wherein the deskew index corresponds to a data rate;
    replacing the truncated number of lower bits with a predetermined bit sequence;
  demodulating a delayed signal to extract a delayed symbol in the multirate system having the plurality of Walsh code lengths;
  aligning the delayed symbol to the deskew buffer address using a delayed PN count value;
  modifying the deskew buffer address;
  reading a previously saved symbol from the deskew buffer address;
  adding the delayed symbol to the previously saved symbol to produce a combined symbol; and
  writing the combined symbol into the modified deskew buffer address.

* * * * *